(12) United States Patent
Choi et al.

(10) Patent No.: US 10,470,318 B2
(45) Date of Patent: Nov. 5, 2019

(54) METHOD OF MANUFACTURING TRANSPARENT PROTECTION WINDOW (71) Applicant: SAMSUNG DISPLAY CO., LTD., Yongin-si, Gyeonggi-do (KR)

(72) Inventors: Jae-Woo Choi, Yongin-si (KR); Kwan-Young Han, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 311 days.

(21) Appl. No.: 15/210,604

(22) Filed: Jul. 14, 2016

(65) Prior Publication Data

US 2016/0324018 A1 Nov. 3, 2016

Related U.S. Application Data

(62) Division of application No. 13/783,448, filed on Mar. 4, 2013, now Pat. No. 9,398,706.

(30) Foreign Application Priority Data

Oct. 16, 2012 (KR) .................. 10-2012-0115032

(51) Int. Cl.
*B29C 53/04* (2006.01)
*H05K 5/00* (2006.01)
*G06F 1/16* (2006.01)
*H04N 5/65* (2006.01)
*B29C 51/08* (2006.01)
*B29C 51/26* (2006.01)
*B29K 33/00* (2006.01)
(Continued)

(52) U.S. Cl.
CPC ......... *H05K 5/0017* (2013.01); *B29C 51/082* (2013.01); *B29C 51/266* (2013.01); *B29C 53/04* (2013.01); *G06F 1/1652* (2013.01); *H04N 5/65* (2013.01); *B29K 2033/12* (2013.01); *B29K 2069/00* (2013.01); *B29K 2995/0026* (2013.01); *B29L 2031/3475* (2013.01); *G06F 2200/1634* (2013.01); *Y10T 428/24479* (2015.01)

(58) Field of Classification Search
CPC ...... B29C 51/082; B29C 53/04; G06F 1/1652
See application file for complete search history.

(56) References Cited

U.S. PATENT DOCUMENTS 3,308,327 A 3/1967 Shrader
6,603,254 B1 8/2003 Ando
(Continued)

FOREIGN PATENT DOCUMENTS

KR 10-2006-0129848 A 12/2006
KR 10-0864407 B1 10/2008
(Continued)

*Primary Examiner* — Elizabeth A Burkhart
(74) *Attorney, Agent, or Firm* — Kile Park Reed & Houtteman PLLC (57) ABSTRACT

A transparent protection window, a flexible display apparatus, and associated method, the transparent protection window including a first area extending in one direction, the first area having a first thickness; a second area extending in a direction different from that of the first area, the second area having a second thickness; and a third area connecting the first area to the second area, the third area including a portion having a curved surface, wherein the first thickness of the first area is less than the second thickness of the second area.

5 Claims, 5 Drawing Sheets

(51) Int. Cl.
*B29K 69/00* (2006.01)
*B29L 31/34* (2006.01)

(56) References Cited

U.S. PATENT DOCUMENTS

| | | |
|---|---|---|
| 7,378,686 B2 | 5/2008 | Beeson et al. |
| 7,379,686 B2 | 5/2008 | Nishikawa |
| 7,656,088 B2 | 2/2010 | Lee et al. |
| 7,960,913 B2 | 6/2011 | Yee et al. |
| 8,582,282 B2 | 11/2013 | Kim et al. |
| 8,896,202 B2 | 11/2014 | Oh |
| 2006/0279209 A1 | 12/2006 | Yamaguchi et al. |
| 2007/0170849 A1 | 7/2007 | Park |
| 2011/0281072 A1* | 11/2011 | Sabia .............. C03B 23/023 428/156 |
| 2012/0151760 A1* | 6/2012 | Steijner .............. B24B 1/00 29/831 |
| 2012/0324955 A1* | 12/2012 | Lim .............. C03B 23/0302 65/60.1 |
| 2013/0140965 A1* | 6/2013 | Franklin .............. H05K 999/99 312/223.1 |
| 2014/0022745 A1 | 1/2014 | Ehrenpfordt |
| 2015/0108439 A1 | 4/2015 | Kim et al. |

FOREIGN PATENT DOCUMENTS

| | | |
|---|---|---|
| KR | 10-2009-0011652 A | 2/2009 |
| KR | 10-2010-0019729 A | 2/2010 |
| KR | 10-2011-0104634 A | 9/2011 |

* cited by examiner

METHOD OF MANUFACTURING TRANSPARENT PROTECTION WINDOW

CROSS-REFERENCE TO RELATED PATENT APPLICATIONS

This is a divisional application based on pending application Ser. No. 13/783,448, filed Mar. 4, 2013, the entire contents of which is hereby incorporated by reference.

This application claims the benefit of Korean Patent Application No. 10-2012-0115032, filed on Oct. 16, 2012, in the Korean Intellectual Property Office, the disclosure of which is incorporated herein in its entirety by reference.

BACKGROUND

1. Field of the Invention

The embodiments relate to a transparent protection window, a flexible display apparatus with the same, and a method of manufacturing the transparent protection window.

2. Description of the Related Art

Display apparatuses are apparatuses that display an image. Examples of display apparatuses may include televisions, computer monitors, personal digital assistants (PDAs), smart appliances, and the like, which have explosively increased in demand in recent years. For example, display apparatuses may include all devices in which display image signals are inputted from or exported to the outside.

High-definition flat panel display panels, e.g., organic light-emitting display panels, liquid crystal display panels, plasma display panels, and electrophoretic indication display panels, may be used in display apparatus.

SUMMARY

The embodiments provide a transparent protection window having an improved mechanical strength, a flexible display apparatus including the same, and a method of manufacturing the transparent protection window.

According to an embodiment, there is provided a transparent protection window including: a first area extending in one direction, the first area having a first thickness; a second area extending in a direction different from that of the first area, the second area having a second thickness; and a third area connecting the first area to the second area, the third area having a curved surface, wherein the transparent protection window satisfies the following Equation,
<Equation>

$$t1 < t2$$

where, $t1$ and $t2$ represent the first thickness and the second thickness, respectively.

The third area may include a connection part connected to the first area and a second connection part connected to the second area and have a thickness gradually increasing from the first connection part to the second connection part.

The third area may have the curved surface and a flat surface facing the curved surface and disposed outside the curved surface.

The first area may have a first surface connected to the curved surface of the third area and a second surface facing the first surface, and the first and second surfaces may be flat surfaces.

The first area may have a first surface connected to the curved surface of the third area and a second surface facing the first surface, wherein the first surface may be a curved surface having a curvature less than that of the curved surface of the third area, and the second surface may be a flat surface.

The second and third areas may extend from one edge of the first area.

The second and third areas may extend from both edges of the first area, respectively.

According to another aspect of the present invention, there is provided a flexible display apparatus including: a transparent protection window including a first area extending in one direction, the first area having a first thickness, a second area extending in a direction different from that of the first area, the second area having a second thickness, and a third area connecting the first area to the second area, the third area having a curved surface, wherein the transparent protection window satisfies the following Equation; and a flexible display panel having a shape corresponding to the first, second, and third areas of the transparent protection window, the flexible display panel being disposed on one surface of the transparent protection window to display an image, <Equation>

$$t1 < t2$$

where, $t1$ and $t2$ represent the first thickness and the second thickness, respectively.

The third area may include a connection part connected to the first area and a second connection part connected to the second area and have a thickness gradually increasing from the first connection part to the second connection part.

The third area may have the curved surface and a flat surface facing the curved surface and disposed outside the curved surface.

The first area may have a first surface connected to the curved surface of the third area and a second surface facing the first surface, and the first and second surfaces may be flat surfaces.

The first area may have a first surface connected to the curved surface of the third area and a second surface facing the first surface, wherein the first surface may be a curved surface having a curvature less than that of the curved surface of the third area, and the second surface may be a flat surface.

The flexible display panel may include a display area displaying the image and a non-display area except the display area, wherein the display area may be disposed to correspond to the first area of the transparent protection window.

The flexible display apparatus may further include a touch panel disposed between the flexible display panel and the transparent protection window, the touch panel having a shape corresponding to the first, second, and third areas of the transparent protection window.

The flexible display panel may include a flexible substrate, an organic light-emitting device disposed on the flexible substrate, and an encapsulation thin film disposed on the organic light-emitting device.

According to further another aspect of the present invention, there is provided a method of manufacturing a transparent protection window including: preparing the transparent protection window; bending at least one portion of the transparent protection window to form a first area extending in one direction, a second area extending in a direction different from that of the first area, and a third area connecting the first area to the second area and having a curved surface; and removing at least one portions of the first and third areas along a thickness direction of the first area.

The forming of the first, second, and third areas may include forming the first and second areas having the same second thickness and the third area connecting the first area to the second area, and the removing of the at least one portions of the first and third areas may include removing at least one portions of the first and third areas so that the first area has a first thickness less than the second thickness, and the third area has a thickness gradually increasing from a first connection part connected to the first area to a second connection part connected to the second area.

The forming of the first, second, and third areas may include pressing the transparent protection window by using a first mold disposed in a direction of a first surface of the transparent protection window and having a curved surface on at least one portion thereof and a second mold disposed in a direction of a second surface facing the first surface and having a curved surface on at least one portion thereof to correspond to the first mold.

The removing of the at least one portions of the first and third areas may include removing at least one portions of the first and third areas by grinding the at least one portions of the first and second areas along a thickness direction of the first area.

The removing of the at least one portions of the first and third areas may include removing at least one portions of the first and third areas by etching the at least one portions of the first and second areas along a thickness direction of the first area.

BRIEF DESCRIPTION OF THE DRAWINGS

Features will become apparent to those of skill in the art by describing in detail exemplary embodiments with reference to the attached drawings in which.

DETAILED DESCRIPTION

Exemplary embodiments will now be described in detail with reference to the accompanying drawings. In the drawings, like reference numbers refer to like elements, and also the size of each component may be exaggerated for clarity of illustration.

Figure 1:
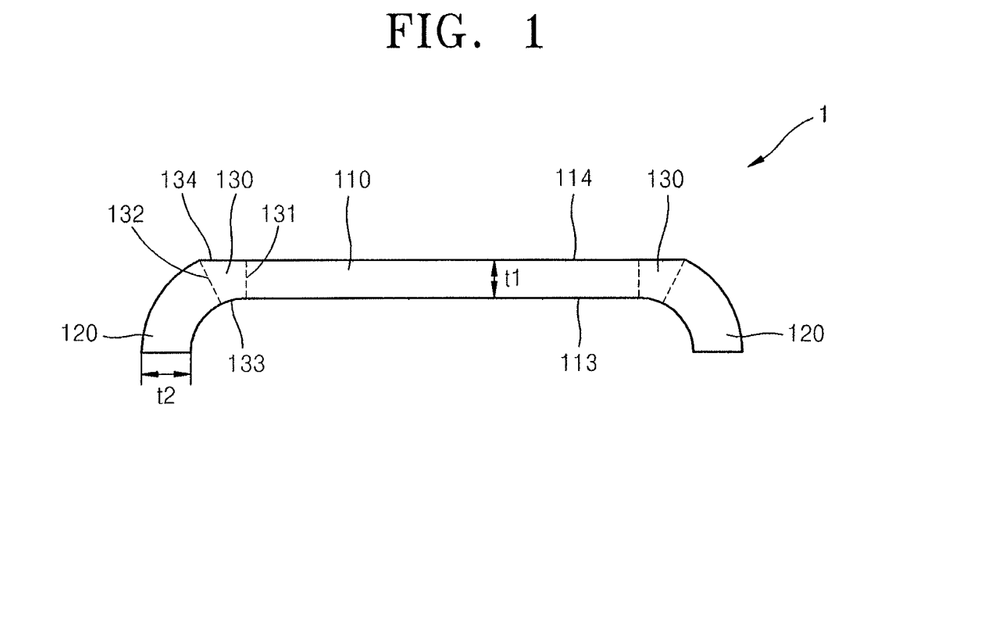
FIG. 1 illustrates a perspective view of a transparent protection window according to an embodiment.

FIG. 1 illustrates a perspective view of a transparent protection window 1 according to an embodiment.

Referring to FIG. 1, the transparent protection window 1 according to the current embodiment may include a first area 110 extending in one direction and having a first thickness t1, a second area 120 extending in a direction different from that of the first area 110 and having a second thickness t2, and a third area 130 connecting the first area 110 to the second area 120 and having a curved surface. For example, the first thickness t1 may be less than the second thickness t2.

The third area 130 includes a first connection part 131 that is connected to the first area 110 and a second connection part 132 that is connected to the second area 120. The third area 130 may have a thickness that gradually increases from the first connection part 131 to the second connection part 132.

In the current embodiment, the first connection part 131 may have the first thickness t1, and the second connection part 132 may have the second thickness t2. Thus, the third area 130 may have a thickness that gradually increases from the first thickness t1 to the second thickness t2.

Also, the third area 130 may have two surfaces 133 and 134 facing each other. Here, the surface 133 disposed on an inside of the third area 130 may be a curved, and the surface 134 disposed on an outside of the third area 130 may be flat. The curved surface 133 may have a predetermined curvature, e.g., radius of curvature.

The transparent protection window 1 according to the current embodiment may be used as a member that protects an outermost surface of a display apparatus and maintains a shape of the outermost surface of the display apparatus. For example, a display area of the display apparatus displaying an image may correspond to the first area 110 of the transparent protection window 1. The thickness of the first area 110 may have an influence on the total thickness of the display apparatus. Thus, the first area 110 may have a thickness adequate for a preset design value.

Accordingly, with the tendency for a display apparatus that is lightweight and miniaturized, the first area 110 may have a thickness less than a predetermined value. Thus, the mechanical strength of the transparent protection window 1 may be deteriorated.

For example, when the transparent protection window 1 includes a bending part, a strength of the bending part may be deteriorated. Also, when the bending part is formed, cracks may occur.

However, in the transparent protection window 1 according to the current embodiment, the first area 110 has the first thickness t1, and the second area 120, which does not have an influence on the thickness of the display apparatus, has the second thickness t2 that is greater than the first thickness t1. Thus, the mechanical strength of the transparent protection window 1 may be improved.

For example, the third area 130 may have a value or thickness corresponding to the first thickness t1 and the second thickness t2. Also, the strength of the third area 130 having a relatively weaker strength than other areas may be reinforced to help prevent the cracks from occurring. In addition, the cracks occurring during the manufacturing process may be removed. Hereinafter, a method of manufacturing the transparent protection window 1 will be described in detail.

A first area 110 of the transparent protection window 1 may have a first surface 113, which is connected to a curved surface 133 of a third area 130, and a second surface 114 facing the first surface 113. The first and second surfaces 113 and 114 may substantially be flat surfaces.

For example, the first and second surfaces 113 and 114 may be parallel to each other. The first area 110 may have a uniform thickness over an entire surface thereof, i.e., a first thickness t1.

A second area 120 extending in a direction different from, e.g., perpendicular to, an extension direction of the first area 110 may have a second thickness t2 that is greater than the first thickness t1. Also, the second area 120 may be connected to a second connection part 132 of the third area 130. Although the third area 130 of the transparent protection window 1 has a curved surface over an entire area, the embodiments are not limited thereto. For example, the curved surface may be formed only in a portion of the third area 130, and a surface of the third area 130 may be flat.

Also, the second and third areas 120 and 130 may be disposed on both edges of the first area 110, respectively. However, the embodiments are not limited thereto. For example, the transparent protection widow 1 may have various shapes corresponding to desired shapes of an apparatus to which the transparent protection widow 1 is attached, for example, a display apparatus.

Figure 2:
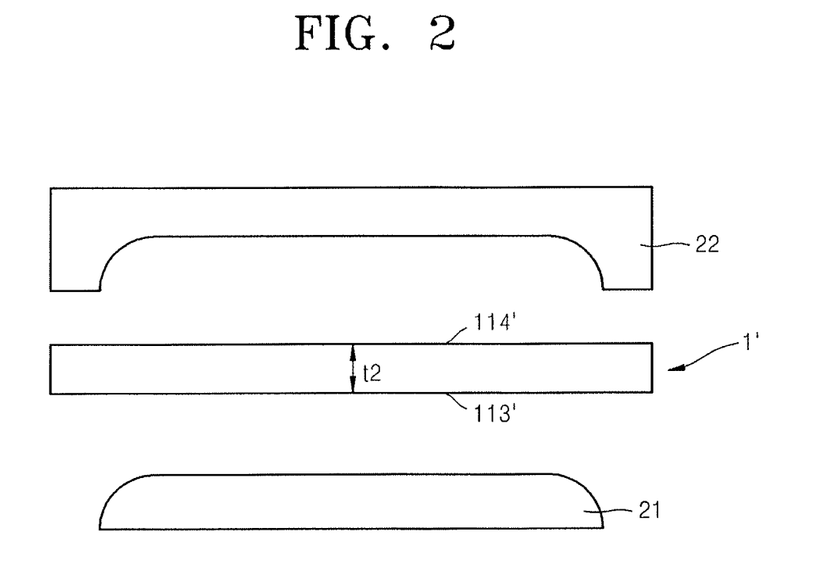
FIGS. 2 to 4 illustrate cross-sectional views of stages in a method of manufacturing the transparent protection window of FIG. 1, according to an embodiment.
Figure 3:
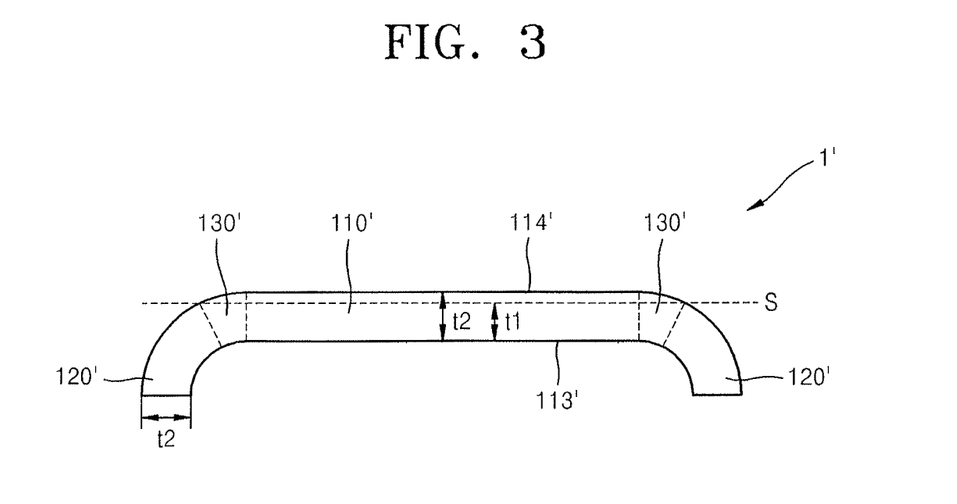
Figure 4:
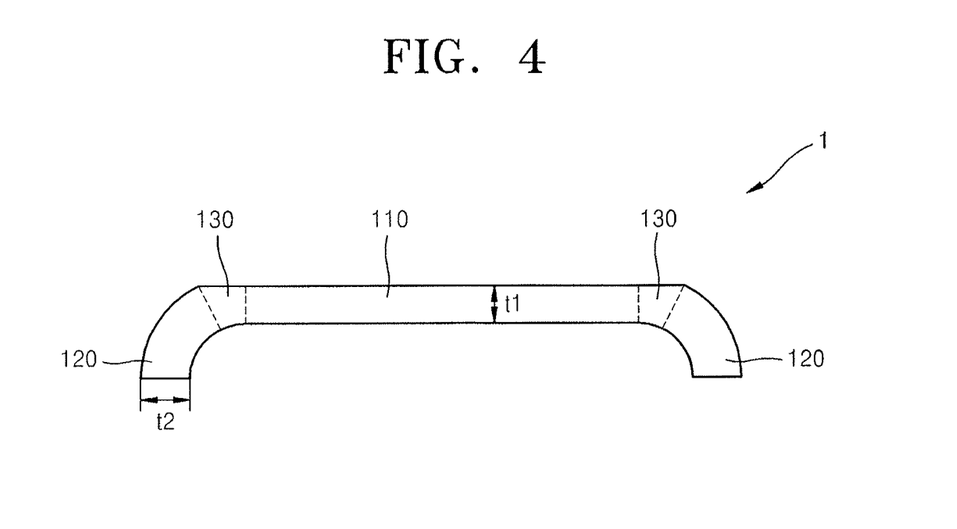

FIGS. 2 to 4 illustrate cross-sectional views of stages in a method of manufacturing the transparent protection window 1 of FIG. 1, according to an embodiment.

Referring to FIG. 2, a transparent protection window, e.g., a preliminary transparent protection window, 1' having a predetermined thickness, i.e., a second thickness t2, and having first and second surfaces 113' and 114', which are flat surfaces parallel to each other, is prepared. A first mold 21 is disposed in a direction of the first surface 113', and a second mold 22 is disposed in a direction of the second surface 114'.

The transparent protection window 1' may be a transparent thermoplastic resin, e.g., polymethyl methacrylate (PMMA) or polycarbonate (PC), or glass.

Each of the first and second molds 21 and 22 may have a curved surface corresponding to a preset three-dimensional shape (3D) of the transparent protection window 1'. For example, the first and second molds 21 and 22 may have shapes that are roughly complementary to one another. Also, each of the first and second molds 21 and 22 may have or provide a sufficient temperature to deform the shape of the transparent protection window 1'. The temperature may vary according to a material for forming the transparent protection window 1'. The first and second molds 21 and 22 that are heated at a predetermined temperature are pressed to form the transparent protection window 1' having a 3D shape.

For example, the transparent protection window 1' may be heated and pressed by the first and second molds 21 and 23, and then the first and second molds 21 and 22 may be removed to cool the transparent protection window 1'. Thus, the shape of the transparent protection window 1' may be fixed.

Referring to FIG. 3, the transparent protection window 1' includes a first area 110' extending in one direction and having the second thickness t2, a second area 120' extending in a direction different from that of the first area 110' and having the second thickness t2, and a third area 130' connecting the first area 110' to the second area 120' and having a curved surface.

For example, the first to third areas 110', 120', and 130' of the transparent protection window 1' of FIG. 3 substantially have the same thickness, e.g., the second thickness t2. Here, when the transparent protection window 1' is heated and pressed by the first and second molds 21 and 22 of FIG. 2, a portion of the transparent protection window 1' may extend in a length direction of the second and third areas 120' and 130' to reduce a thickness thereof. However, since the reduction in the thickness of the transparent protection window 1' is very small as compared to the total thickness of the transparent protection window 1', the first to third areas 110', 120', and 130' may substantially have the same thickness.

After the shape of the transparent protection window 1' is fixed, at least one portion of the first and third areas 110' and 130' may be removed by cutting an outer portion of the second surface 114' of the first area 110' and a portion of an outer surface of the third area 130' along a cutting line S in a thickness direction of the first area 110'.

For example, portions of the first and third areas 110' and 130' may be removed by grinding or chemical etching.

Referring to FIG. 4, when the transparent protection window 1 of FIG. 1 is manufactured through the removal process, the thickness of the first area 110 on the transparent protection window 1 may be reduced from the second thickness t2 to the first thickness t1, and the thickness of the third area 130 may be gradually increased from the first thickness t1 to the second thickness t2.

For example, the first thickness t1 may be a value adequate from a preset design value in consideration of the total thickness of a display apparatus to which the transparent protection window 1 is attached.

In the manufacturing method of the transparent protection window 1, when the transparent protection window 1' is heated and pressed by the first and second molds 21 and 22 of FIG. 2 and cooled to fix the shape thereof, cracks may occur in the curved portions.

However, when the at least one portion of the first and second areas 110' and 130' of FIG. 3 are removed, the cracks may be removed to provide a transparent protection window 1 which does not have cracks.

Although the shape of the transparent protection window 1 is formed by using molds in the manufacturing method of the transparent protection window 1, the embodiments are not limited thereto. For example, the 3D shape of the transparent protection window 1 may be formed by using various methods, such as a heated roller.

Figure 5:
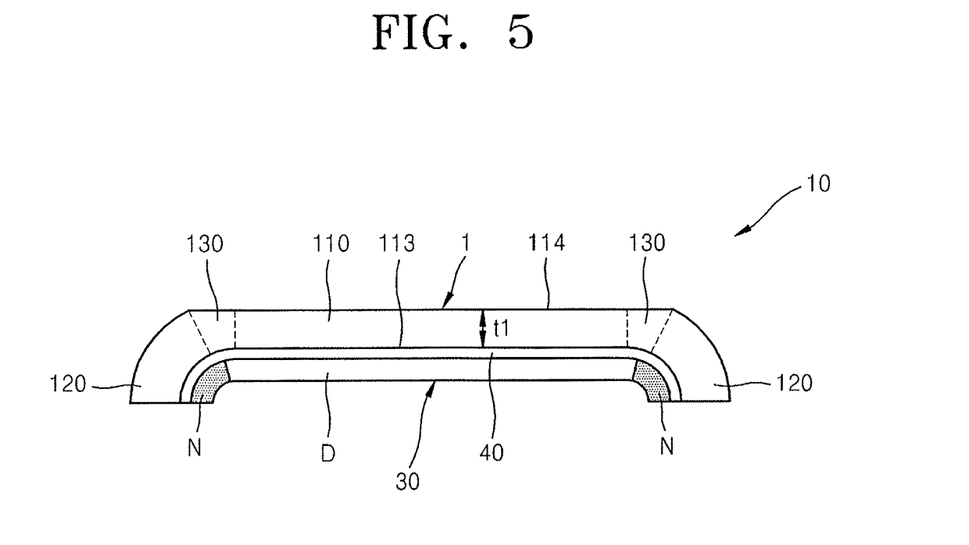
FIG. 5 illustrates a cross-sectional view of a flexible display apparatus according to an embodiment.
Figure 6:
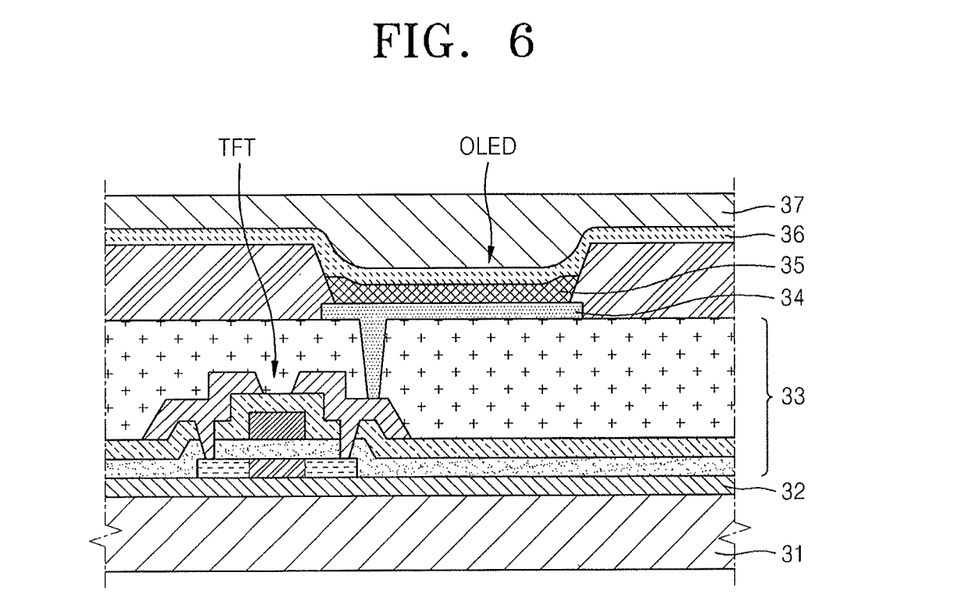
FIG. 6 illustrates a cross-sectional view of one pixel area included in a display area of the flexible display apparatus of FIG. 5.

FIG. 5 illustrates a cross-sectional view of a flexible display apparatus 10 according to an embodiment. FIG. 6 illustrates a cross-sectional view of one pixel area included in a display area D of the flexible display apparatus 10 of FIG. 5.

Referring to FIGS. 5 and 6, the flexible display apparatus 10 according to the current embodiment may include the transparent protection window 1 and a flexible display panel 30 that is disposed on one surface 113 of the transparent protection window 1 to display an image, wherein the flexible display panel 30 includes a display area D and a non-display area N other than the display area D.

The transparent protection window 1 may include the transparent protection window 1 of FIG. 1. The flexible display panel 30 may have a shape corresponding to the first, second, and third areas 110, 120, and 130 of the transparent protection window 1 and is disposed inside the transparent protection window 1.

The transparent protection window 1 may maintain a curved shape of the flexible display panel 30 and protect the flexible display panel 30 against external impact or scratches.

Also, the flexible display apparatus 10 according to the current embodiment may further include a touch panel 40 between the transparent protection window 1 and the flexible display panel 30 and having a shape corresponding to the first, second, and third areas 110, 120, and 130 of the transparent protection window 1.

The touch panel 40 may be a device which detects a pressure or an electrical change of capacity applied thereto to generate a signal according to the touch. The touch panel 40 may include a transparent electrode (not shown).

The touch panel 40 may be disposed between the transparent protection window 1 and the flexible display panel 30. Thus, the flexible display apparatus 10 that is capable of detecting a touch to generate a signal may be realized.

The flexible display panel 30 may display an image. Also, the flexible display panel 30 may include the display area D that corresponds to the first area 110 of the transparent protection window 1 and the non-display area N along an outer edge of the display area D. All sorts of circuits (not shown) and electrical wires (not shown) that are controlled to display an image on the display area D may be disposed on the non-display area N.

The touch panel 40 is on the flexible display panel 30 in a direction in which an image is displayed. Also, the touch panel 40 may include a touch area (not shown) corresponding to the display area D of the flexible display panel 30 and a wire area (not shown) corresponding to the non-display area N.

The display area D of the flexible display panel 30 may include a flexible substrate 31, a barrier layer 32 on the flexible substrate 31, a device/wire layer 33 on the barrier layer 32, an organic light-emitting device (OLED) on the device/wire layer 33, and an encapsulation thin film 37 on the OLED.

The flexible substrate 31 may be formed of plastic having superior heat resistance and durability, e.g., polyethylene terephthalate (PET), polyimide, polycarbonate, polyethylene naphthalate, polyarylate (PAR), and polyetherimide. In an implementation, the flexible substrate 31 may be formed of various materials having flexibility.

The barrier layer 32 may be disposed on the flexible substrate 31 to help prevent foreign substances, such as moisture or oxygen, from being introduced from the flexible substrate 31 and thus permeating into the device/wire layer 33 and the OLED.

The device/wire layer 33 may be on the barrier layer 32. The device/wire layer 33 may include a driving thin film transistor (TFT) driving the OLED, a switching TFT (not shown), and a capacitor (not shown).

The driving TFT may include an active layer, a gate, a source electrode, and a drain electrode.

The OLED may be on the device/wire layer 33. The OLED may include a pixel electrode 34, an organic light-emitting layer 35 disposed on the pixel electrode 34, an opposite electrode 36 disposed on the organic light-emitting layer 35. The OLED may be electrically connected to the driving TFT.

The encapsulation thin film 37 may be on the opposite electrode 36. The encapsulation thin film 37 may include a multi-layered inorganic membrane or inorganic and organic membranes. The encapsulation thin film 37 may protect the OLED against external moisture and oxygen.

Light emitted from the organic light-emitting layer 35 included in the OLED may be emitted toward the flexible substrate 31 or the encapsulation thin film 37. The transparent protection window (see reference numeral 1 of FIG. 5) and the touch panel (see reference numeral 40 of FIG. 5) may be disposed on a side of the flexible substrate 31 or the encapsulation thin film 37 on which an image is displayed.

Although the flexible display apparatus 10 of FIG. 5 includes the transparent protection widow 1 of FIG. 1, the embodiments are not limited thereto. For example, the flexible display apparatus 10 may include a transparent protection window that is described next according to another embodiment.

Figure 7:
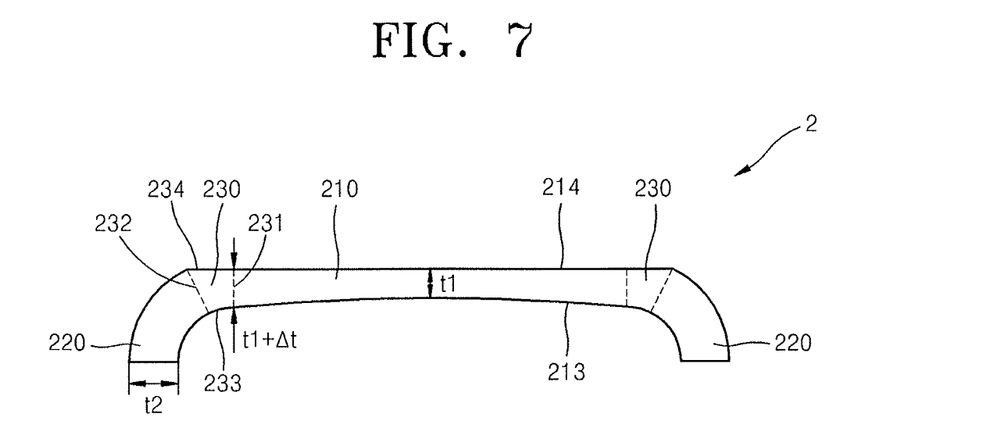
FIG. 7 illustrates a cross-sectional view of a transparent protection window according to another embodiment.

FIG. 7 illustrates a cross-sectional view of a transparent protection window 2 according to another embodiment.

Referring to FIG. 7, the transparent protection window 2 according to the current embodiment is the same as the transparent protection window 1 of FIG. 1, except for the shapes of first and second surfaces 213 and 214 facing each other of a first area 210.

For example, the first area 210 of the transparent protection window 2 may have the first surface 213, which is connected to a curved surface 233 of a third area 230, and the second surface 214 facing the first surface 213. Here, the first surface 213 may be a curved surface having a curvature less than (i.e., a radius of curvature greater than) that of the curved surface 233 of the third area 230, and the second surface 214 may be a substantially flat surface.

The first and second surfaces 213 and 214 are not parallel to each other. Thus, the first area 210 may have a non-uniform thickness overall.

When the thinnest area of the first area 210 is defined as a first thickness t1, a second area 220 may have a second thickness t2 that is greater than the first thickness t1. The third area 230 may include a first connection part 231 that is connected to the first area 210 and a second connection part 232 that is connected to the second area 220. Also, the third area 230 may have a thickness that gradually increases from the first connection part 231 to the third connection part 232.

Here, the first connection part 231 may have a thickness t1+Δt corresponding to a sum of the first thickness t1 and a thickness variation Δt varying according to a curvature of the first surface 213 of the first area 210. The second connection part 232 has the second thickness t2. Thus, the third area 230 may have a thickness gradually increasing from the thickness t1+Δt to the second thickness t2.

Here, the first surface 213 has a curvature that is significantly less than that of the second area 220 and/or the third area 230. Thus, the thickness variation Δt may be very small. Also, the thickness t1+Δt of the first connection part 231 is less than the second thickness t2.

Although not shown, the transparent protection window 2 of FIG. 7 together with a flexible display panel may constitute a flexible display apparatus. Here, a surface corresponding to the first area 210 of the transparent protection window 2 of the flexible display panel may be curved to correspond to the first surface 213.

Figure 8:
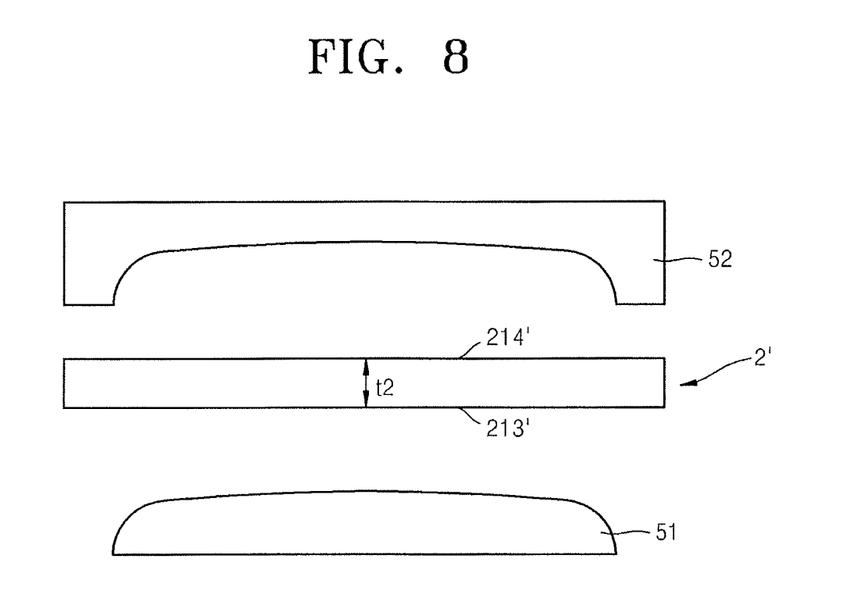
FIGS. 8 and 9 illustrate cross-sectional views of sages in a method of manufacturing the transparent protection window of FIG. 7, according to an embodiment.
Figure 9:
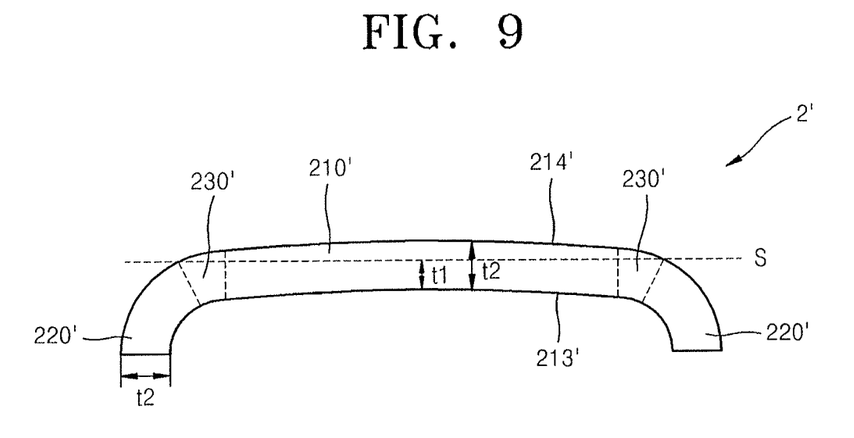

FIGS. 8 and 9 illustrate cross-sectional views of stages in a method of manufacturing the transparent protection window 2 of FIG. 7, according to an embodiment of the present invention.

Referring to FIG. 8, a transparent protection window, e.g., a preliminary transparent protection window, 2' having a predetermined thickness, i.e., a second thickness t2 and having first and second surfaces 213' and 214', which are flat surfaces parallel to each other, is prepared. A first mold 51 is disposed in a direction of the first surface 213', and a second mold 52 is disposed in a direction of the second surface 214'.

Each of the first and second molds 51 and 52 may have a curved surface corresponding to a preset 3D shape of the transparent protection window 2'. For example, the first and second molds 51 and 52 may have shapes roughly complementary to one another. Also, each of the first and second molds 51 and 52 may have or provide a sufficient temperature to deform the shape of the transparent protection window 2'. Here, each of the surfaces of the first and second molds 51 and 52 corresponding to the transparent protection window 2' may be curved overall. Also, a curvature of a central portion of the curved surface may be less than that of an outer portion of the curved surface, i.e., the central portion of the curved surface may have a radius of curvature greater than a radius of curvature of the outer portions of the curved surface.

The transparent protection window 2' may be heated and pressed by the first and second molds 51 and 23, and then the first and second molds 51 and 52 may be removed to cool the transparent protection window 2'. Thus, the shape of the transparent protection window 2' may be fixed.

Referring to FIG. 9, the transparent protection window 2' includes a first area 210', a second area 220', and a third area 230'. Here, each of the first and second surfaces 213' and 214' of the first area 210' may have a curved surface having a curvature less than that of each of the second and third areas 220' and 230'.

After the shape of the transparent protection window 2' is fixed, at least one portion of the first and third areas 210' and 230' of the transparent protection window 2' may be removed by cutting an outer portion of the second surface 214' and a portion of an outer surface of the third area 230' along a cutting line S in a thickness direction of the first area 210'. Here, a central portion of the first area 210' may have a thickness gradually decreasing from the second thickness t2 to the first thickness t1.

For example, the first and third areas 210' and 230' may be removed by grinding or chemical etching.

When the transparent protection window 2 of FIG. 7 is manufactured through the removal process, the first surface 213 of the first area 210 of the transparent protection window 2 may have a curved surface having a curvature less than that of the curved surface 233 of the third area 230. Also, the second surface 214 facing the first surface 213 may substantially be a flat surface.

Figure 10:
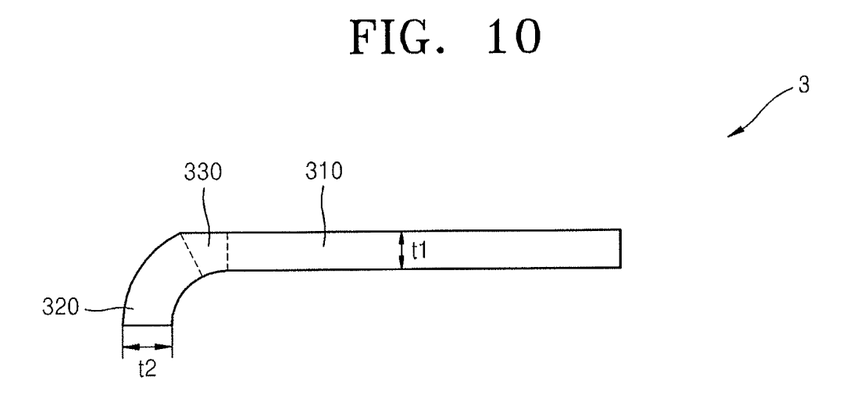
FIG. 10 illustrates a cross-sectional view of a transparent protection window according to another embodiment.

FIG. 10 illustrates a cross-sectional view of a transparent protection window 3 according to another embodiment.

Referring to FIG. 10, the transparent protection window 3 according to the current embodiment is the same as the transparent protection window 1 of FIG. 1, except for a structure in which second and third areas 320 and 330 are disposed on only one edge of a first area 310, rather than on both edges of the first area 310.

Figure 11:
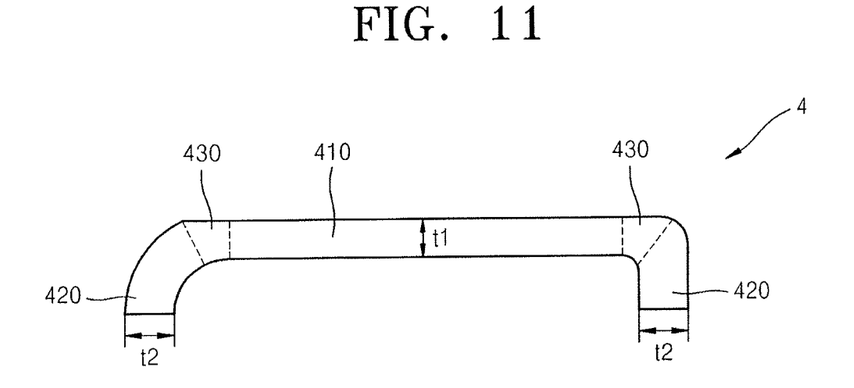
FIG. 11 illustrates a cross-sectional view of a transparent protection window according to another embodiment.

FIG. 11 illustrates a cross-sectional view of a transparent protection window 4 according to another embodiment.

Referring to FIG. 11, the transparent protection window 4 according to the current embodiment is the same as the transparent protection window 1 of FIG. 1, except for a structure in which second and third areas 420 and 430 respectively disposed on both edges of a first area 410 have different curvatures and shapes.

The above-described embodiments are merely several examples of the transparent protection window. Thus, the transparent protection window may be manufactured in various shapes.

By way of summation and review, flexible display apparatuses may be lightweight and miniaturized and have better portability. To improve the aesthetic sense of such flexible display apparatuses or to obtain expanded visual effects of a display area, a curved portion may be formed on the flexible display apparatus.

A support unit, such as a window, may be additionally disposed to maintain the curved shape to which a flexible display panel is fixed. However, cracks may occur when the curved portion is formed on the window or in the formed curved portion.

The embodiments provide a transparent protection window having improved mechanical strength, a flexible display apparatus including the same, and a method of manufacturing the transparent protection window.

The occurrence of cracks in the curved portion of the transparent protection window may be prevented. In addition, any cracks occurring during the manufacturing of the transparent protection window may be removed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing a transparent protection window, the method comprising:

preparing a preliminary transparent protection window;

bending at least one portion of the preliminary transparent protection window to form a first area extending in a first direction, a second area extending in a second direction different from the first direction and having a first surface and a second surface, and a third area connecting the first area to the second area and having a concave curved surface; and removing at least one portion of the first and third areas such that the third area has a flat surface opposite to the concave curved surface thereof, wherein a first thickness of the first area is less than a second thickness of the second area, and wherein:

the first surface of the second area is directly connected to the flat surface of the third area, the second surface of the second area is directly connected to the concave curved surface of the third area, and the first surface of the second area and the flat surface of the third area respectively face in different directions from each other.

2. The method of claim 1, wherein:

forming the first, second, and third areas includes forming the first and second areas having the second thickness and the third area connecting the first area to the second area before removing the at least one portion of the first and second areas, and removing the at least one portion of the first and third areas includes removing at least one portion of the first and third areas such that the first area has the first thickness that is less than the second thickness, and the third area has a thickness that gradually increases from a first connection part that is connected to the first area to a second connection part that is connected to the second area.

3. The method of claim 1, wherein forming the first, second, and third areas include pressing the preliminary transparent protection window by using:

a first mold disposed in a direction of a first surface of the transparent protection window and having a curved surface on at least one portion thereof, and a second mold disposed in a direction of a second surface facing the first surface and having a curved surface on at least one portion thereof to correspond to the first mold.

4. The method of claim 1, wherein removing the at least one portion of the first and third areas includes removing at least one portion of the first and third areas by grinding the at least one portion of the first and second areas.

5. The method of claim 1, wherein removing the at least one portion of the first and third areas includes removing at least one portion of the first and third areas by etching the at least one portion of the first and second areas.

* * * * *